United States Patent
Badger et al.

(10) Patent No.: US 11,001,262 B2
(45) Date of Patent: May 11, 2021

(54) VEHICLE SYSTEMS AND METHODS FOR AVOIDING UNINTENTIONAL ELECTRIFIED VEHICLE MOVEMENT AND FOR REDUCING ELECTRIFIED VEHICLE NOISE, VIBRATION, AND HARSHNESS

(71) Applicant: FORD GLOBAL TECHNOLOGIES, LLC, Dearborn, MI (US)

(72) Inventors: Justin Reuel Badger, Plymouth, MI (US); Shunsuke Okubo, Belleville, MI (US); Kent Hancock, Ann Arbor, MI (US); Thomas Francis Rolewicz, Jr., Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 599 days.

(21) Appl. No.: 15/420,385

(22) Filed: Jan. 31, 2017

(65) Prior Publication Data
US 2018/0215383 A1 Aug. 2, 2018

(51) Int. Cl.
*B60W 20/17* (2016.01)
*B60W 20/15* (2016.01)
(Continued)

(52) U.S. Cl.
CPC ......... *B60W 30/18109* (2013.01); *B60K 6/24* (2013.01); *B60K 6/26* (2013.01); *B60K 6/28* (2013.01); *B60K 6/445* (2013.01); *B60K 6/48* (2013.01); *B60L 7/10* (2013.01); *B60L 15/2081* (2013.01); *B60W 10/06* (2013.01); *B60W 10/08* (2013.01); *B60W 20/00* (2013.01); *B60W 20/15* (2016.01); *B60W 20/17* (2016.01); *B60W 20/40* (2013.01); *B60W 30/18027* (2013.01); *B60W 30/18118* (2013.01); *B60W 50/082* (2013.01); *B60K 6/365* (2013.01); *B60K 2006/268* (2013.01); *B60L 2240/642* (2013.01); *B60L 2260/22* (2013.01); *B60W 2510/1005* (2013.01); *B60W 2540/16* (2013.01);
(Continued)

(58) Field of Classification Search
CPC .......... B60W 30/18109; B60W 10/06; B60W 10/08; B60W 20/40; B60W 2510/1005; B60W 2550/142; B60W 2710/083; B60W 2710/06; B60L 7/10; B60K 6/365; B60K 6/24; B60K 6/28; B60K 6/26; B60K 6/48; B60K 2006/268; Y10S 903/906; Y10S 903/905; Y10S 903/91; B60Y 2306/09
See application file for complete search history.

(56) References Cited

U.S. PATENT DOCUMENTS 6,384,490 B1    5/2002  Birzl et al.
6,494,801 B1 *  12/2002  Ohtake ................. B60K 6/365
                                                    475/5
(Continued)

FOREIGN PATENT DOCUMENTS

GB          2413999 B       8/2008

*Primary Examiner* — Genna M Mott
(74) *Attorney, Agent, or Firm* — David B. Kelley; Carlson, Gaskey & Olds

(57) ABSTRACT

A method includes controlling an electrified vehicle by automatically commanding an output torque from an electric machine if the electrified vehicle is in park and an engine start or stop request has been received. A road grade may be used to determine whether or not to command the output torque.

21 Claims, 3 Drawing Sheets

(51) Int. Cl.

| | | |
|---|---|---|
| *B60W 30/18* | (2012.01) | |
| *B60W 20/00* | (2016.01) | |
| *B60K 6/445* | (2007.10) | |
| *B60W 50/08* | (2020.01) | |
| *B60L 15/20* | (2006.01) | |
| *B60K 6/24* | (2007.10) | |
| *B60K 6/26* | (2007.10) | |
| *B60K 6/28* | (2007.10) | |
| *B60K 6/48* | (2007.10) | |
| *B60L 7/10* | (2006.01) | |
| *B60W 10/06* | (2006.01) | |
| *B60W 10/08* | (2006.01) | |
| *B60W 20/40* | (2016.01) | |
| *B60K 6/365* | (2007.10) | |

(52) U.S. Cl.
CPC ..... *B60W 2552/15* (2020.02); *B60W 2710/06* (2013.01); *B60W 2710/083* (2013.01); *B60Y 2306/09* (2013.01); *Y02T 10/62* (2013.01); *Y02T 10/72* (2013.01); *Y10S 903/905* (2013.01); *Y10S 903/906* (2013.01); *Y10S 903/91* (2013.01)

(56) References Cited

U.S. PATENT DOCUMENTS

| | | | |
|---|---|---|---|
| 8,046,142 B2* | 10/2011 | Morris | B60W 30/20 |
| | | | 701/29.1 |
| 8,645,037 B2 | 2/2014 | Kato et al. | |
| 8,700,247 B1* | 4/2014 | Wise | B60W 10/08 |
| | | | 123/350 |
| 8,983,692 B2* | 3/2015 | Heap | B60W 10/06 |
| | | | 180/65.265 |
| 9,108,620 B2* | 8/2015 | Lehmen | B60W 10/06 |
| 2009/0118078 A1* | 5/2009 | Wilmanowicz | B60K 6/445 |
| | | | 477/3 |
| 2010/0116235 A1* | 5/2010 | Imamura | B60K 6/445 |
| | | | 123/179.3 |
| 2012/0277963 A1* | 11/2012 | Xia | B60K 6/365 |
| | | | 701/58 |
| 2013/0151048 A1 | 6/2013 | Kwon et al. | |
| 2013/0225363 A1 | 8/2013 | Lehmen et al. | |
| 2013/0297121 A1* | 11/2013 | Reed | B60W 10/02 |
| | | | 701/22 |
| 2013/0305863 A1* | 11/2013 | Weslati | F16H 63/48 |
| | | | 74/411.5 |
| 2015/0111693 A1* | 4/2015 | Wang | B60K 6/48 |
| | | | 477/5 |
| 2015/0159613 A1* | 6/2015 | Jensen | B60W 30/18018 |
| | | | 701/68 |
| 2018/0209534 A1* | 7/2018 | Takeuchi | B60L 50/61 |

* cited by examiner

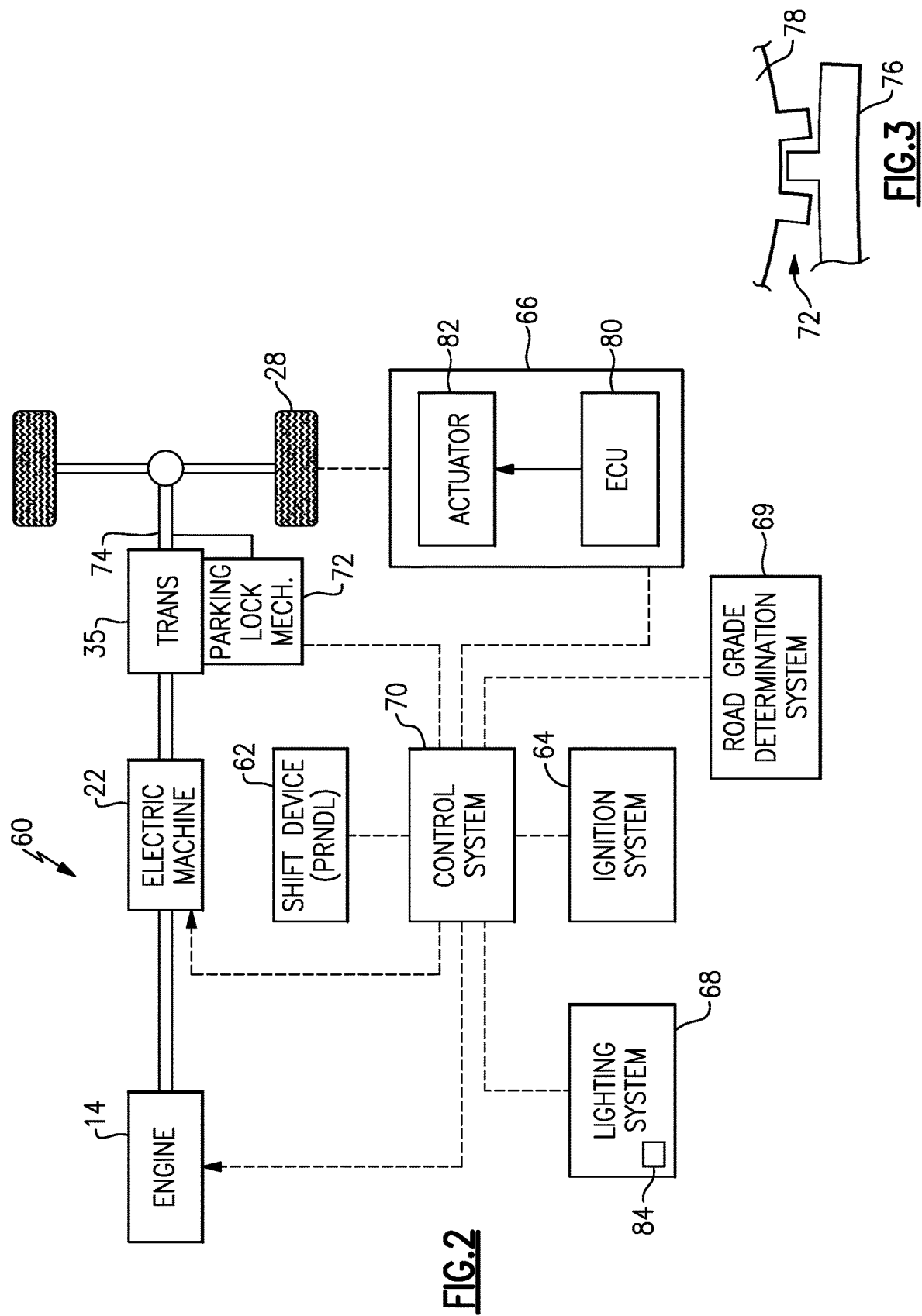

VEHICLE SYSTEMS AND METHODS FOR AVOIDING UNINTENTIONAL ELECTRIFIED VEHICLE MOVEMENT AND FOR REDUCING ELECTRIFIED VEHICLE NOISE, VIBRATION, AND HARSHNESS

TECHNICAL FIELD

This disclosure relates to systems and methods for electrified vehicles. An exemplary method of controlling an electrified vehicle includes automatically commanding an electric machine torque output to a portion of a vehicle driveline if the electrified vehicle is in park and an engine start or stop request has been received.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

Some electrified vehicles, such as hybrid electric vehicles (HEV's), are equipped with both an engine and an electric machine. Starting the engine of an HEV while in park can produce noise, vibration, and harshness. This may be undesirable to the vehicle operator.

SUMMARY

A method according to an exemplary aspect of the present disclosure includes controlling an electrified vehicle by automatically applying an output torque from an electric machine to a portion of a vehicle driveline if the electrified vehicle is in park, an engine start or stop request has been received, and a road grade is less than a predefined road grade threshold.

In a further non-limiting embodiment of the foregoing method, the method includes starting an engine of the electrified vehicle after applying the output torque.

In a further non-limiting embodiment of either of the foregoing methods, the method includes eliminating the output torque after the engine is started.

In a further non-limiting embodiment of any of the foregoing methods, the method includes stopping the engine of the electrified vehicle after applying the output torque.

In a further non-limiting embodiment of any of the foregoing methods, the method includes eliminating the output torque after the engine is stopped.

In a further non-limiting embodiment of any of the foregoing methods, the electric machine is an electric motor or generator.

In a further non-limiting embodiment of any of the foregoing methods, a shift device indicates if the electrified vehicle is in park.

In a further non-limiting embodiment of any of the foregoing methods, the method includes determining whether the engine start or stop request has been received prior to applying the output torque.

In a further non-limiting embodiment of any of the foregoing methods, applying the output torque moves a pawl into further meshing engagement with a notched wheel of a parking lock mechanism.

In a further non-limiting embodiment of any of the foregoing methods, the method includes determining a road grade prior to applying the output torque.

In a further non-limiting embodiment of any of the foregoing methods, the method includes starting or stopping the electrified vehicle without applying the output torque if the road grade exceeds the predefined road grade threshold.

In a further non-limiting embodiment of any of the foregoing methods, applying the output torque mimics applying a vehicle brake to avoid unintended vehicle movement and reduce unwanted noise, vibration, and harshness during the engine start or stop request.

An electrified vehicle according to another exemplary aspect of the present disclosure includes a driveline and an electric machine. A control system is configured with instructions for automatically commanding the electric machine to supply an output torque to a portion of the driveline if the electrified vehicle is in park, an engine start or stop request has been received, and a road grade is less than a predefined road grade threshold.

In a further non-limiting embodiment of the foregoing electrified vehicle, a shift device indicates whether the electrified vehicle is in park.

In a further non-limiting embodiment of either of the foregoing electrified vehicles, a road grade determination system is configured to measure or estimate the road grade.

In a further non-limiting embodiment of any of the foregoing electrified vehicles, the control system is configured with instructions for removing the output torque after the engine is started.

In a further non-limiting embodiment of any of the foregoing electrified vehicles, the control system is configured with instructions for removing the output torque after the engine is stopped.

In a further non-limiting embodiment of any of the foregoing electrified vehicles, the electric machine is an electric motor or generator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates a vehicle system of an electrified vehicle.

FIG. 3 illustrates portions of a parking lock mechanism of the vehicle system of FIG. 2.

DETAILED DESCRIPTION

This disclosure details vehicle systems and methods for controlling electrified vehicles in a manner that reduces the amount of noise, vibration, and harshness perceived by the electrified vehicle driver/operator/passenger. An exemplary method includes controlling an electrified vehicle by automatically commanding an electric machine torque output to a portion of a vehicle driveline if the electrified vehicle is in park and an engine start or stop request has been received. In some embodiments, the torque output of the electric machine is commanded only if a road grade is below a predefined road grade threshold. These and other features are discussed in greater detail in the following paragraphs of this detailed description.

Figure 1:
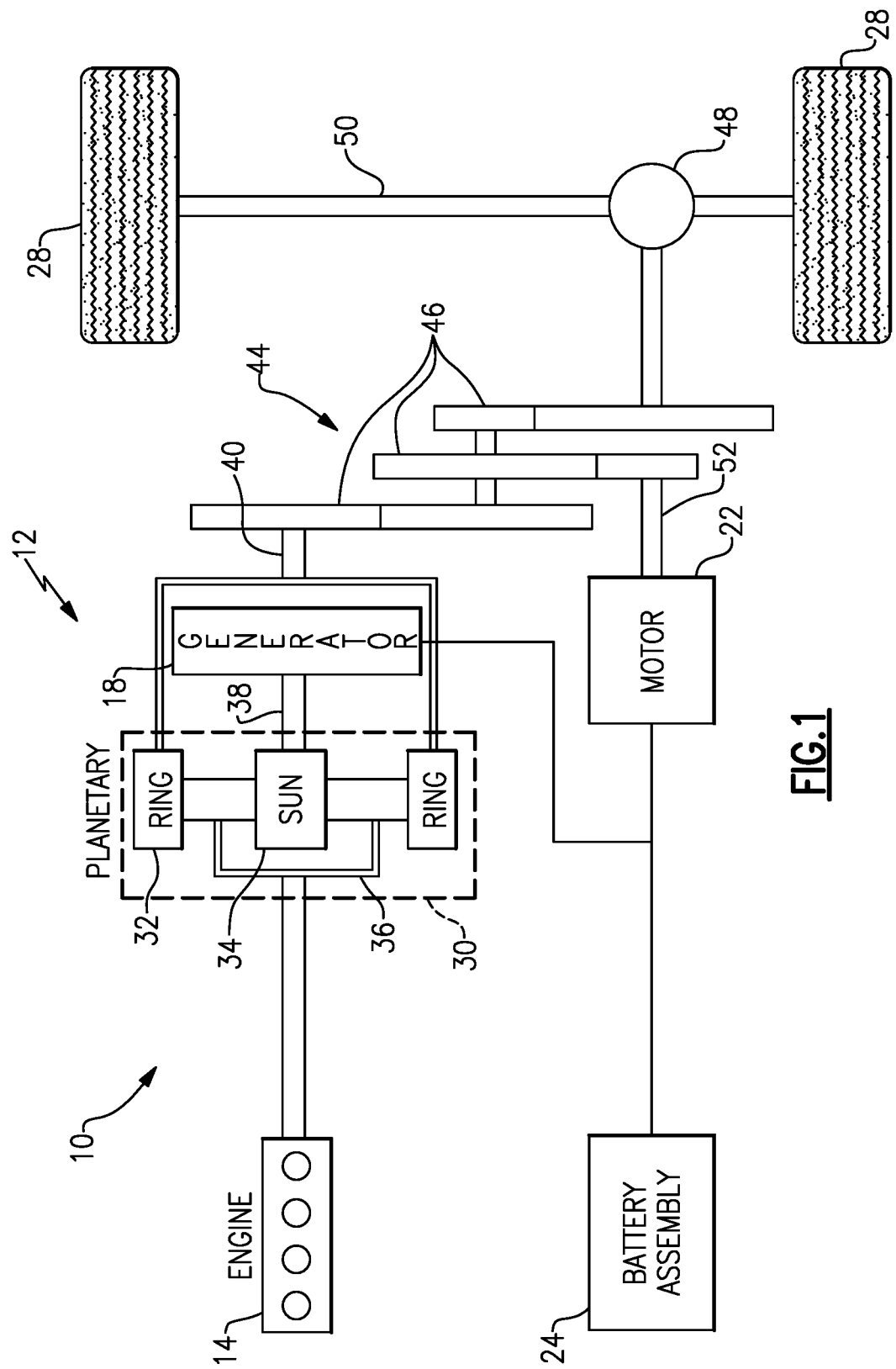
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other types of electrified vehicles, including, but not limited to, plug-in hybrid electric vehicles (PHEV's).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle wheels 28. The differential 48 may include a plurality of gears that enable the transfer of torque to the vehicle wheels 28. In one embodiment, the second power transfer unit 44 is mechanically coupled to an axle 50 through the differential 48 to distribute torque to the vehicle wheels 28.

The motor 22 can also be employed to drive the vehicle wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

FIG. 2 schematically illustrates a vehicle system 60 that may be incorporated into an electrified vehicle, such as the electrified vehicle 12 of FIG. 1. The vehicle system 60 may be employed to reducing unwanted noise, vibration, and harshness that can occur during electrified vehicle operation. For example, undesirable noise, vibration, and harshness can occur when starting (or stopping) the engine 14 while the electrified vehicle is in park (i.e., a non-drive gear). The vehicle system 60 is designed to address these undesirable side effects. In a non-limiting embodiment, the vehicle system 60 includes an engine 14, an electric machine 22 (e.g., an electric motor or generator), a transmission 35, a shift device 62, an ignition system 64, a braking system 66, a lighting system 68, a road grade determination system 69, and a control system 70. It should be understood; however, that the vehicle system 60 could be made up of fewer or additional components. Together, the engine 14, the electric machine 22, the transmission 35 and vehicle wheels 28 make up a majority of a driveline of the electrified vehicle.

The shift device 62 is located within a passenger compartment of the electrified vehicle and is generally used to change a gear of the transmission 35. For example, the shift device 62 may be used to shift the transmission 35 into park (P), reverse (R), neutral (N), drive (D), low (L), etc. In a first non-limiting embodiment, the shift device 62 is a shift lever movable to change the gear. In a second non-limiting embodiment, the shift device 62 is an electronic shift device that includes one or more joysticks, dials and/or buttons for changing the gear.

When the shift device 62 is positioned in park, a parking lock mechanism 72 of the transmission 35 is engaged to substantially lock an output shaft 74 of the transmission 35. When engaged, a pawl 76 of the parking lock mechanism 72 is moved into meshing engagement with a notched wheel 78 of the parking lock mechanism 72 to lock the output shaft 74 (see, for example, FIG. 3).

The ignition system 64 is selectively employed to start the electrified vehicle. In a non-limiting embodiment, the ignition system 64 is controlled by a key operated ignition switch. In an alternative non-limiting embodiment, the ignition system 64 includes a push-button ignition switch equipped to start the vehicle when a valid key or fob is located inside or near the electrified vehicle. In some embodiments, an engine start or stop request is associated with actuation of the ignition system 64.

The braking system 66 can be selectively actuated to brake the electrified vehicle by locking the vehicle wheels 28. The braking system 66 could include friction brakes, a parking brake, or any other braking device. In a non-limiting embodiment, the braking system 66 is an electronic braking device that includes an electronic control unit (ECU) 80 and an actuator 82.

The lighting system 68 may include a multitude of lighting and signaling devices located throughout the vehicle for illuminating the vehicle and alerting other drivers and/or pedestrians to the vehicle's presence and to the driving intentions of the vehicle. Among various other lighting and signaling devices, the lighting system 68 includes one or more brake lamps 84 that can be illuminated when the braking system 66 has been applied.

The vehicle system 60 may also be equipped with a road grade determination system 69. The road grade determination system 69 may either measure or calculate a road grade using any known road grade measurement or estimation technique. In a non-limiting embodiment, the road grade may be measured or calculated based on the relationship between one or more of vehicle speed, vehicle acceleration, yaw rate, wheel torques, vehicle mass, drag forces, etc. In another non-limiting embodiment, the road grade is directly measured by the braking system 66 and is provided to the control system 70 as a vehicle level signal. In yet another non-limiting embodiment, the road grade is estimated using any known road grade estimation technique. Although shown schematically as a separate system, the road grade determination system 69 could be part of the braking system 66 or a stability control system, or could be control logic programmed into the control system 70.

The control system 70 is programmed with instructions for controlling the vehicle system 60 and its various components. In particular, the control system 70 may control operation of the vehicle system 60, and thus the electrified vehicle, in a manner that reduces undesirable noise, vibration, and harshness. The control system 70 may be a part of, or communicate with, a vehicle system controller of the electrified vehicle, or any other controller. In a non-limiting embodiment, the control system 70 is part of a hybrid powertrain control module (HPCM).

The control system 70 may include one or more control modules equipped with executable instructions for interfacing with and commanding operation of various components of the vehicle system 60. Each such control module may include a processing unit and non-transitory memory for executing the various control strategies and modes of the vehicle system 60.

In a non-limiting embodiment, the control system 70 communicates/receives control signals to/from each of the engine 14, the electric machine 22, the parking lock mechanism 72, the shift device 62, the ignition system 64, the braking system 66, the lighting system 68, and the road grade determination system 69 for controlling operation of the electrified vehicle. The control system 70 may communicate with these components over a controller area network (CAN), in a non-limiting embodiment.

In a further non-limiting embodiment, the control system 70 is configured to command the electric machine 22 to produce an output torque that is applied to a portion of the driveline of the electrified vehicle if the shift device 62 is positioned in park and an engine start request has been received. The decision to apply the output torque may also be based on a road grade measured or calculated by the road grade determination system 69. The output torque from the electric machine 22 causes the pawl 76 of the parking lock mechanism 72 to move into further engagement with the notched wheel 78. This movement takes the lag or "play" out of the engagement between the pawl 76 and the notched wheel 78 and therefore prevents unintended vehicle movement and reduces unwanted noise, vibration, and harshness during the subsequent engine start or stop.

Figure 4:
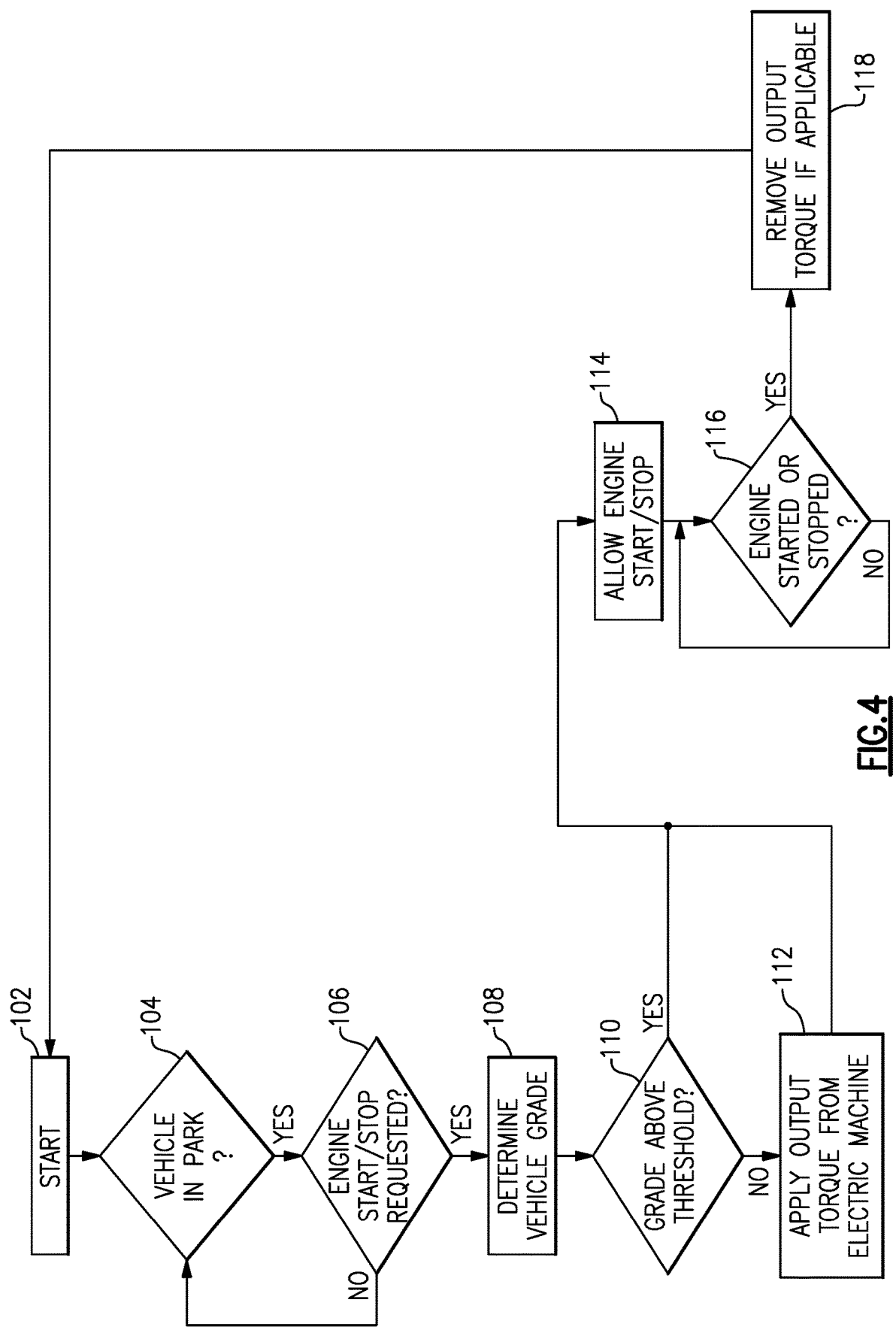
FIG. 4 schematically illustrates a vehicle control strategy for controlling an electrified vehicle in a manner that reduces noise, vibration, and harshness.

FIG. 4, with continued reference to FIGS. 1-3, schematically illustrates a vehicle control strategy 100 for controlling an electrified vehicle in a manner that reduces the amount of noise, vibration, and harshness perceived by a driver or passenger of the electrified vehicle. In a non-limiting embodiment, the control system 70 may be programmed with one or more algorithms adapted to execute the vehicle control strategy 100, or any other control strategy.

The exemplary vehicle control strategy 100 begins at block 102. At block 104, the control strategy 100 determines whether or not the electrified vehicle is in park. For example, the control system 70 may monitor the status of the shift device 62 to determine whether it is currently positioned in the park position. The shift device 62 may include one or more sensors for communicating shift position signals to the control system, in a non-limiting embodiment.

If the shift device 62 is determined to be positioned in park, the control strategy 100 proceeds to block 106. At this step, the control strategy 100 determines whether an engine start or stop has been requested. A variety of factors may be utilized to determine whether an engine start or stop has been requested, including but not limited to state of charge or discharge limits, climate control requests, CHT based thresholds, and catalyst temperature maintenance.

If blocks 104 and 106 both return "YES" flags, the control strategy 100 proceeds to block 108 and determines a road grade upon which the electrified vehicle is being operated on. At block 110, the control strategy 100 determines whether the road grade previously determined at block 108 exceeds a predefined road grade threshold. If NO, the control strategy 100 proceeds to block 112 by commanding an output torque request signal to the electric machine 22. The electric machine 22 is then spun up to generate an output torque that is applied to a portion of the vehicle driveline, such as the vehicle wheels 28, at block 212.

In a non-limiting embodiment, the control system 70 communicates the output torque command request signal to the electric machine 22. The amount of output torque commanded to the driveline will vary depending on a variety of factors, including but not limited to the amount of lag existing in the driveline and the road grade. The output torque from the electric machine 22 may be either a positive torque or a negative torque depending on the reaction forces and architecture of the vehicle driveline, the road grade, and the positioning of the electrified vehicle relative to the road surface, among other factors.

The output torque from the electric machine 22 causes the pawl 76 of the parking lock mechanism 72 to move into further engagement with the notched wheel 78. This movement takes the lag or "play" out of the engagement between the pawl 76 and the notched wheel 78 and therefore reduces unwanted noise, vibration, and harshness during the subsequent engine start or stop. Providing the output torque during vehicle starts or stops in park emulates the behavior of applying the friction brakes of the vehicle without the need to actually apply the brakes, thus providing a smoother engine start or stop sequence.

In another non-limiting embodiment, the brake lamps 84 of the lighting system 68 are prevented from being illuminated during the output torque routine of the electric machine 22. The control system 70 may communicate with the lighting system 68 during the control strategy 100 to prevent illumination of the brake lamps 84 during the control strategy 100.

Alternatively, if the road grade does exceed the predefined road grade threshold at block 110, the control strategy 100 may proceed directly to block 114. Applying an output torque from the electric machine 22 is not necessary to remove the lag or "play" from the vehicle driveline if the road grade is sufficiently steep.

The engine 14 is started or stopped at block 114. Noise, vibration, and harshness are limited during the engine start or stop because the output torque from the electric machine 22 has removed any potential lag in the driveline. After confirming that the engine 14 has started or stopped at block 116, the control strategy 100 proceeds to block 118 by commanding the electric machine 22 to stop producing the output torque, if applicable.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling an electrified vehicle by automatically applying an output torque from an electric machine to a portion of a vehicle driveline when the electrified vehicle is in park, an engine start or stop request has been received, and a road grade is less than a predefined road grade threshold.

2. The method as recited in claim 1, comprising starting an engine of the electrified vehicle after applying the output torque.

3. The method as recited in claim 2, comprising eliminating the output torque after the engine is started.

4. The method as recited in claim 1, comprising stopping the engine of the electrified vehicle after applying the output torque.

5. The method as recited in claim 4, comprising eliminating the output torque after the engine is stopped.

6. The method as recited in claim 1, wherein the electric machine is an electric motor or generator.

7. The method as recited in claim 1, wherein a shift device indicates whether the electrified vehicle is in park.

8. The method as recited in claim 1, comprising determining whether the engine start or stop request has been received prior to applying the output torque.

9. The method as recited in claim 1, wherein applying the output torque moves a pawl into further meshing engagement with a notched wheel of a parking lock mechanism.

10. The method as recited in claim 1, comprising determining a road grade prior to applying the output torque.

11. The method as recited in claim 10, comprising starting or stopping the electrified vehicle without applying the output torque when the road grade exceeds the predefined road grade threshold.

12. The method as recited in claim 1, wherein applying the output torque mimics applying a vehicle brake to avoid unintended vehicle movement and reduce unwanted noise, vibration, and harshness during the engine start or stop request.

13. An electrified vehicle, comprising:
a driveline;
an electric machine; and
a control system configured with instructions for automatically commanding the electric machine to supply an output torque to a portion of the driveline when the electrified vehicle is in park, an engine start or stop request has been received, and a road grade is less than a predefined road grade threshold.

14. The electrified vehicle as recited in claim 13, comprising a shift device that indicates whether the electrified vehicle is in park.

15. The electrified vehicle as recited in claim 13, comprising a road grade determination system configured to measure or estimate the road grade.

16. The electrified vehicle as recited in claim 13, wherein the control system is configured with instructions for removing the output torque after the engine is started.

17. The electrified vehicle as recited in claim 13, wherein the control system is configured with instructions for removing the output torque after the engine is stopped.

18. The electrified vehicle as recited in claim 13, wherein the electric machine is an electric motor or generator.

19. The method as recited in claim 1, comprising preventing illumination of a brake lamp while the output torque is being applied to the vehicle driveline.

20. The method as recited in claim 1, wherein the output torque is negative torque.

21. A method, comprising:
automatically determining whether a road grade is less than a predefined threshold when an electrified vehicle is in park and an engine start request or an engine stop request is received;
automatically applying an output torque from an electric machine to a vehicle driveline when the road grade is less than the predefined threshold; and
commanding the engine to start or stop while the output torque is still being applied to the vehicle driveline.

* * * * *